US006492902B2

(12) United States Patent
Nishimoto et al.

(10) Patent No.: US 6,492,902 B2
(45) Date of Patent: Dec. 10, 2002

(54) ULTRASONIC OBSTACLE DETECTOR

(75) Inventors: Yukio Nishimoto, Tokyo (JP); Naoki Miyamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/850,207

(22) Filed: May 8, 2001

(65) Prior Publication Data

US 2002/0047780 A1 Apr. 25, 2002

(30) Foreign Application Priority Data

Oct. 25, 2000 (JP) ........................................ 2000-326013

(51) Int. Cl.[7] .............................................. G08B 29/00
(52) U.S. Cl. ........................ 340/506; 340/435; 340/436; 340/580; 340/901; 340/903; 340/943
(58) Field of Search ................................ 340/506, 436, 340/435, 580, 588, 903, 943, 962, 552, 589, 540, 601, 901

(56) References Cited

U.S. PATENT DOCUMENTS

| 4,868,796 A | * | 9/1989 | Ahrens et al. ............... 367/96 |
| 5,574,426 A | * | 11/1996 | Shisgal et al. ............... 340/435 |
| 6,326,886 B1 | * | 2/1998 | Hoffsommer ............... 340/435 |
| 5,844,471 A | * | 12/1998 | Daniel ........................ 340/436 |
| 6,114,950 A | * | 5/1999 | Schaible et al. ............. 340/435 |
| 6,215,415 B1 | * | 9/1999 | Schroder ................. 340/932.2 |
| 6,326,887 B1 | * | 10/1999 | Winner et al. .............. 340/435 |

FOREIGN PATENT DOCUMENTS

| JP | 62-240890 | 10/1987 | ........... G01S/15/93 |
| JP | 63-27779 | 2/1988 | ............. G01S/7/52 |
| JP | 3-3037 | 1/1991 | ............. H04R/1/00 |

* cited by examiner

Primary Examiner—Jeffery Hofsass
Assistant Examiner—Daniel Previl
(74) Attorney, Agent, or Firm—Sughrue Mion, PLLC (57) ABSTRACT

Extraneous matter such as snow or mud sticking to an ultrasonic sensor is detected. An obstacle (10) reflects transmitted waves from an ultrasonic sensor (3), and the indirect waves (k) are received by an ultrasonic sensor (2), whereby the obstacle (10) is detected. The ultrasonic sensor (3) generates direct waves (t) directly received by the ultrasonic sensors (2) and (4), and therefore the ultrasonic sensors (2) and (4) are arranged to monitor also the direct waves (t). The direct waves (t) are attenuated when extraneous matter (8) such as snow or mud sticks to the ultrasonic sensor (4), and the presence of the extraneous matter is detected according to this attenuation.

3 Claims, 8 Drawing Sheets

ULTRASONIC OBSTACLE DETECTOR

BACKGROUND OF THE INVENTION

1. Technical Field

The present invention relates to an ultrasonic obstacle detector for detecting an obstacle using an ultrasonic sensor that transmits and receives ultrasonic waves.

2. Background Art

A conventional obstacle detector for vehicles is shown in the Japanese Patent Publication (unexamined) No. 27779/1988. This detector is provided with an ultrasonic horn, and extraneous matter such as snow or mud is detected by an ultrasonic microphone disposed near an opening of the horn or an electrode disposed in the horn each serving as means for detecting the extraneous matter stuck to the horn.

Since the conventional ultrasonic obstacle detector is constructed as described above, it is necessary to add any assistant parts such as additional ultrasonic microphone or electrode in the horn in order to detect the extraneous matter such as snow or mud.

SUMMARY OF THE INVENTION

The present invention was made to resolve the above-discussed problems and has an object of providing an ultrasonic obstacle detector capable of easily detecting foreign matter without additional parts to the ultrasonic sensor.

An ultrasonic obstacle detector according to Embodiment 1 of the invention is an ultrasonic obstacle detector for detecting an obstacle using at least one ultrasonic sensor transmitting and receiving ultrasonic waves comprising;

a plurality of ultrasonic sensors disposed close to each other so that one of the ultrasonic sensors is arranged to. receive direct waves transmitted from at least one of the other ultrasonic sensors, and means for detecting a state of extraneous matter such as snow or mud sticking to the mentioned ultrasonic sensors according to reception level of the mentioned direct waves.

An ultrasonic obstacle detector according to Embodiment 2 of the invention is an ultrasonic obstacle detector for detecting an obstacle using at least one ultrasonic sensor transmitting and receiving ultrasonic waves comprising;

not less than three ultrasonic sensors disposed close to each other so that one of the ultrasonic sensors is arranged to receive direct waves transmitted from at least one of the other ultrasonic sensors, and means for judging the ultrasonic sensors to which extraneous matter such as snow or mud is sticking according to reception level of the direct waves for each combination of an ultrasonic sensor transmitting ultrasonic waves and an ultrasonic sensor receiving the transmitted direct waves, the combination being changed in order.

An ultrasonic obstacle detector according to Embodiment 3 of the invention is an ultrasonic obstacle detector for detecting an obstacle using at least one ultrasonic sensor transmitting and receiving ultrasonic waves comprising;

a plurality of ultrasonic sensors disposed close to each other so that one of the ultrasonic sensors is arranged to receive direct waves transmitted from at least one of the other ultrasonic sensors, and means for calculating a temperature on the basis of a transfer time and a transfer distance of the mentioned direct waves between the two ultrasonic sensors transmitting and receiving the direct waves, and judging whether or not there is a possibility of snow, frozen ice, or the like sticking to the mentioned ultrasonic sensors according to a value of the calculated temperature.

In the ultrasonic obstacle detector as set forth in claims 1 to 3 of the invention, whether or not extraneous matter such as snow or mud is sticking onto the ultrasonic sensors is detected by monitoring direct waves from the ultrasonic sensors.

DESCRIPTION OF THE PREFERRED EMBODIMENTS

Embodiment 1

Figure 1:
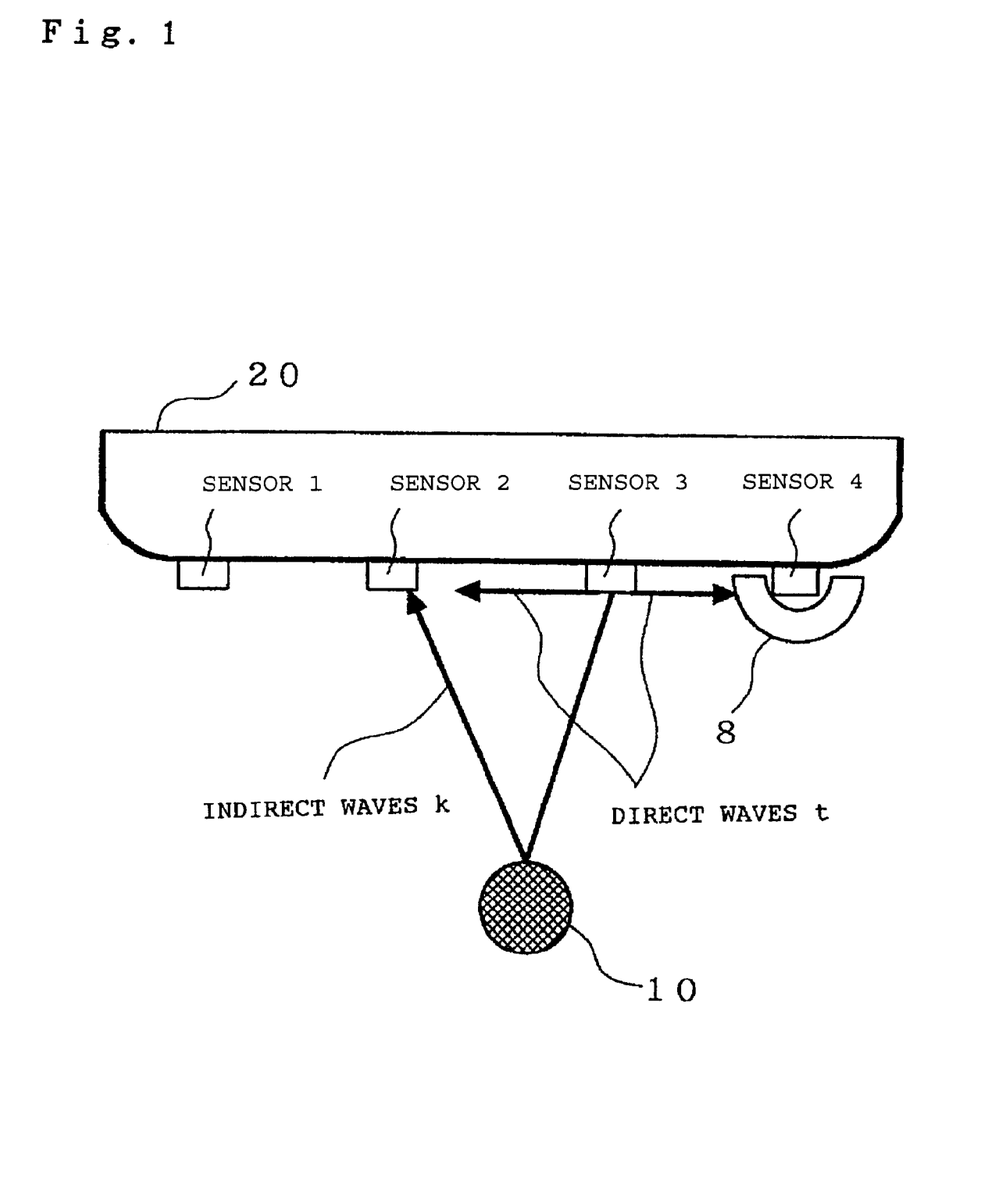
FIG. 1 is a schematic plan view of an essential part for detecting an obstacle using an ultrasonic sensor according to Embodiment 1 of the invention.
Figure 2:
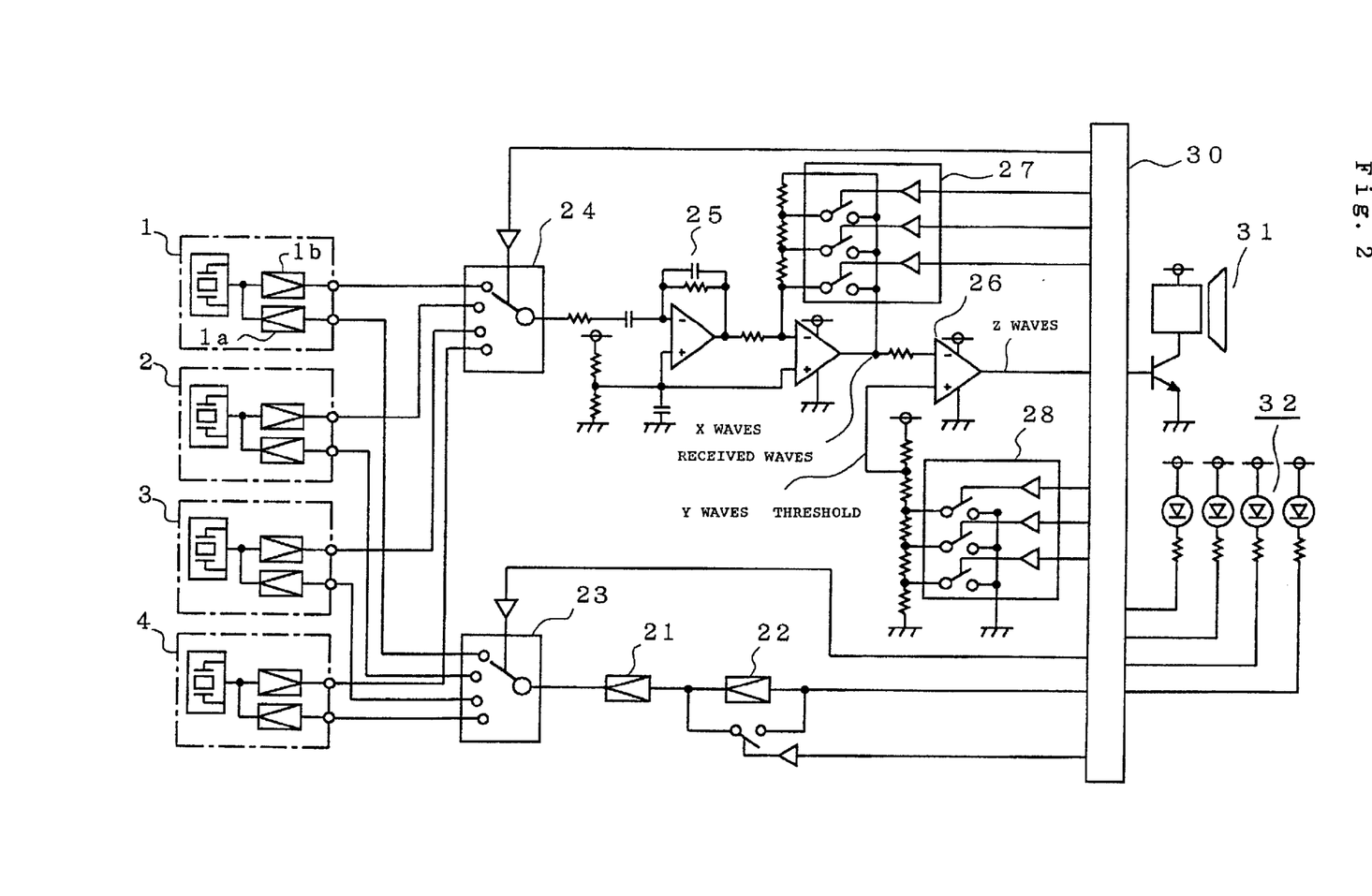
FIG. 2 is a circuit diagram of an ultrasonic obstacle detector according to Embodiment 1 of the invention.
Figure 3:
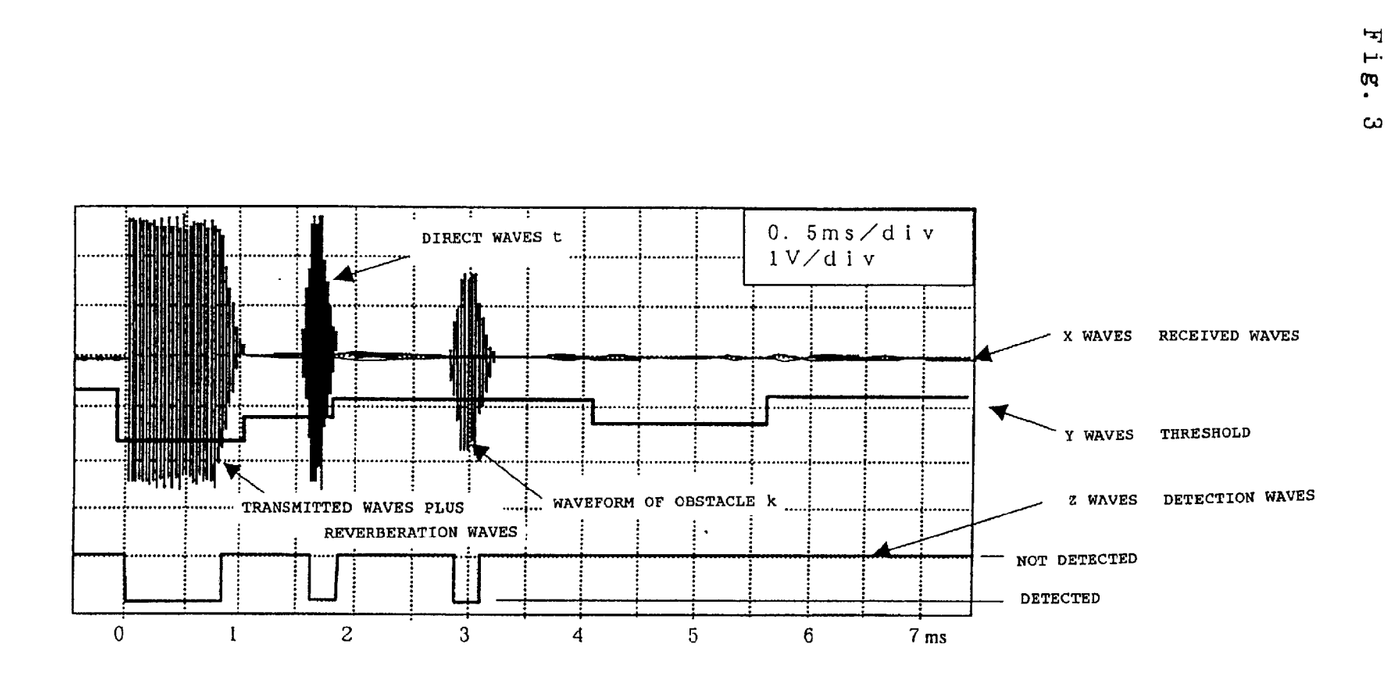
FIG. 3 is a diagram showing a waveform of transmitted/received ultrasonic waves and that of other essential part according to Embodiment 1 of the invention.

FIG. 1 is a schematic plan view of an essential part for detecting an obstacle using an ultrasonic sensor according to Embodiment 1 of the invention, FIG. 2 is a circuit diagram of an ultrasonic obstacle detector, and FIG. 3 is a diagram showing a waveform of transmitted/received ultrasonic.

In FIG. 1, reference numerals 1 to 4 are ultrasonic sensors transmitting ultrasonic waves and receiving ultrasonic waves from outside, and these sensors are mounted on a rear part of a vehicle (a bumper 20) or the like. The ultrasonic sensors 1 and 4 are corner sensors monitoring corner portions of the vehicle, and the ultrasonic sensors 2 and 3 are back sensors monitoring the rear. Numeral 8 is an extraneous matter such as snow or mud, and numeral 10 is an obstacle to be detected.

When parking the vehicle at a parking lot or the like, ultrasonic waves transmitted from the ultrasonic sensors 1 to 4 are reflected by an obstacle 10 or any other obstacle not shown in the drawing. The reflected waves (indirect waves k) are received by the ultrasonic sensors 1 to 4, whereby various obstacles located rear the vehicle are detected, and the driver is informed of the obstacles for safe parking.

In this case, the ultrasonic sensors receive direct waves t from other ultrasonic sensors. Referring to FIG. 1, direct waves t of the ultrasonic sensor 3 are received by the ultrasonic sensor 2. However, when extraneous matter such as snow or mud is sticking onto the ultrasonic sensor 4, the direct waves t cannot be received or the direct waves t are extremely attenuated, thereby lowering the reception level.

Therefore, the sticking degree of the extraneous matter 8 such as snow or mud is detected, and abnormal condition of the ultrasonic sensor 4 is detected by monitoring the state of receiving the direct waves t.

In this case, the direct waves t are attenuated in both cases when the extraneous matter 8 such as snow or mud is on the ultrasonic sensor 3 and when the extraneous matter 8 such as snow or mud is sticking onto the ultrasonic sensors 3 and 4. It is possible to detect that the extraneous matter such as snow or mud is sticking onto at least one of the ultrasonic sensors 3 and 4, and detect that the ultrasonic sensors are in abnormal condition.

It is possible to judge which of the ultrasonic sensor 3 or the ultrasonic sensor 4 has snow or mud stuck thereto, by observing whether or not direct waves t from the ultrasonic sensor 3 are received by the ultrasonic sensor 2.

In other words, when using not less than three ultrasonic sensors, it becomes possible to acknowledge a specific sensor being in abnormal condition by checking each other.

The manner of such discrimination or judgment is now described taking the case of FIG. 1 as an example.

(1) When only the ultrasonic sensor 1 is abnormal:

Direct waves are not detected between the ultrasonic sensor 1 and the ultrasonic sensors 2, 3, and 4. The direct waves are detected between the ultrasonic sensors 2, 3, and 4.

(2) When only the ultrasonic sensor 2 is abnormal:

Direct waves are not detected between the ultrasonic sensor 2 and the ultrasonic sensors 1, 3, and 4. The direct waves are detected between the ultrasonic sensors 3 and 4.

There is a possibility that the direct waves are not detected between the ultrasonic sensors 1 and 3 due to influence of snow sticking onto the ultrasonic sensor 2. This case is judged that the ultrasonic sensor 1 or 2 is abnormal.

(3) When only one of the ultrasonic sensors is normal, it is not possible to make a judgment based on the direct waves, and this case is judged that the ultrasonic sensors are all abnormal.

FIG. 3 shows a waveform of ultrasonic waves when the ultrasonic sensor 4 is free from the extraneous matter 8 such as snow or mud and is working normally. In the drawing, when the ultrasonic sensor 3 transmits ultrasonic waves, the transmitted waves and succeeding reverberation waves are observed. Subsequently, direct waves t appear with a time lag corresponding to the distance between the neighboring ultrasonic sensors 3 and 4. In this case, the drawing shows that the two ultrasonic sensors 3 and 4 are disposed within a distance corresponding to a time of approximately 1.6 ms. Then, a waveform k reflected waves from the obstacle 10 is observed by the ultrasonic sensor 2, and the presence of the obstacle 10 is detected.

If any extraneous matter such as snow or mud is sticking onto the ultrasonic sensor 4, the direct waves t are attenuated, and the direct waves t are not observed, otherwise the signal level is decreased to less than a threshold (Y wave), and the direct waves t are not detected. Therefore, extraneous matter such as snow or mud sticking onto the ultrasonic sensor 4 (and/or the ultrasonic sensor 3) is detected by the observation of the direct waves t.

The circuit diagram of the ultrasonic obstacle detector shown in FIG. 2 is hereinafter described. In the drawing, an ultrasonic vibrator, a transmission amplifier 1a, and a reception amplifier 1b are incorporated in each of the ultrasonic sensors 1 to 4. Numeral 21 and 22 are transmission amplifiers for amplifying a transmission signal of a predetermined frequency generated in a microcomputer 30. Numeral 23 is a transmission switching circuit for delivering transmission signals to the ultrasonic sensors 1 to 4 in order. Numeral 24 is a reception switching circuit for switching and receiving the reception signals of the ultrasonic sensors 1 to 4 in order.

Numeral 25 is a band-pass filter for passing signals in a predetermined required frequency range, and numeral 26 is a comparator circuit for comparing received waves (X wave) with a threshold (Y wave). Numeral 27 is an amplification factor switching circuit for switching an amplification factor of the received waves, and numeral 28 is a threshold switching circuit for switching the value of the threshold (Y wave). Numeral 30 is a microcomputer in charge of the whole control of each circuit in addition to the mentioned transmission function. Numeral 31 is an alarm buzzer, and numeral 32 is a display section having an LED for displaying the detection results including presence of obstacle, sticking level of extraneous matter such as snow or mud, judgement of any abnormal ultrasonic sensor onto which the extraneous matter is sticking.

Referring to FIG. 2, for example, the ultrasonic sensor 3 is selected by the transmission switching circuit 23 to transmit ultrasonic waves and the ultrasonic sensor 4 is selected by the reception switching circuit 24. And if the extraneous matter 8 such as snow or mud is sticking onto the ultrasonic sensor 4 as shown in FIG. 1, then the direct waves t are attenuated, which is eventually judged that there is any extraneous matter.

As described above, it is not always clear the extraneous matter such as snow or mud is sticking onto the ultrasonic sensor 3 or onto the ultrasonic sensor 4. But it is possible to give an alarm that at least one of the ultrasonic sensors 3 and 4 is in abnormal condition and that the extraneous matter may interfere with normal operation of obstacle detection.

In order to judge that the extraneous matter is sticking onto which of the ultrasonic sensor 3 or the ultrasonic sensor 4, the abnormal ultrasonic sensor can be judged by detecting the direct waves in various combinations of the ultrasonic sensors as mentioned above. Switching the transmission switching circuit 23 and the reception switching circuit 24 in FIG. 2 makes such various combinations.

As described above, in this Embodiment 1, it is possible to detect snow, mud or the like sticking without adding any parts to the ultrasonic sensors.

Note that the same transmission frequency is used for the respective ultrasonic sensors. It is therefore possible to use ultrasonic sensors of the same frequency and, consequently, one band-pass filter is sufficient for processing in the circuit.

In case that not less than three ultrasonic sensors are used and direct waves from not less than two other ultrasonic sensors can be detected in one of the ultrasonic sensors, it is possible to judge which ultrasonic sensor is in abnormal condition. Thus, it becomes possible to effectively utilize the normal ultrasonic sensors, and render reliable detection of an obstacle to the user.

Embodiment 2

In this Embodiment 2, outside air temperature is monitored because there is a possibility of malfunction or erroneous operation of the ultrasonic sensors when the outside air temperature drops to a freezing temperature or a snow-sticking temperature.

When direct waves are observed between two ultrasonic sensors, a transfer distance of the direct waves and a distance L between the disposed two ultrasonic sensors are preliminarily fixed, and accordingly the temperature can be calculated from a transfer time T of the direct waves in the following expression (3).

$$C=331.5+0.607 \quad (1)$$

$$T=L/C \quad (2)$$

$$t=(L/T-331.45)/0.607 \quad (3)$$

where: C is a speed of sound (m/s), t is a temperature (° C.), L is a distance (m), and T is a transfer time of the direct waves (s). Speed of sound is 346.7 m/s at 25° C.

In this manner, the temperature at the place where the ultrasonic sensors are disposed can be measured on the basis of the distance through which the direct waves are transmitted and the time in which the direct waves are transmitted. Therefore it is possible to judge from the measured temperature whether or not there is a possibility that the ultrasonic sensors are frozen or snow sticks onto the ultrasonic sensors.

As described above, in this Embodiment 2, the temperature is measured without any temperature sensor, and additional parts therefor are not required.

Since the ultrasonic sensors are frozen or snow sticks onto the ultrasonic sensors only when the temperature is low, the possibility of malfunction is considerably improved by limiting the operation to a time when the temperature is low.

Embodiment 3

In this Embodiment 3, the vehicle is safely stopped for parking, and freezing of the ultrasonic sensors and snow sticking onto the ultrasonic sensors are monitored by comparing the state of obstacles at the time of parking the vehicle and that at the time of starting the vehicle.

(1) As shown in FIG. 1, when the vehicle equipped with the ultrasonic sensors 1 to 4 (corner sensors 1, 4 and back sensors 2, 3) is backed for parking at a parking lot or the like, the vehicle is parked detecting obstacles such as wall in the rear, neighboring vehicle, or bicycle standing near the rear, etc. so that the vehicle does not bump against those obstacles.

(2) When parking the vehicle, a state of the obstacles at the time of stopping the vehicle is stored in a nonvolatile memory (not shown in FIG. 2) or the like incorporated in the microcomputer 30.

(3) Then, at the time of starting the vehicle, the ultrasonic sensors automatically start to detect the state of the surrounding obstacles. At this time, if the ultrasonic sensors are frozen or snow is sticking onto the ultrasonic sensors, it is difficult to detect the state of the obstacles, and the signal level showing the state of the obstacles is lowered.

It is also preferable to actuate the ultrasonic sensors manually by depressing a push button for starting the ultrasonic sensors instead of actuating automatically the ultrasonic sensors in association with starting the engine.

(4) If there is any change in the state of the obstacles through the comparison between the state of the detected obstacles and the state thereof at the time of stopping the vehicle stored in the memory, an alarm is given to the driver for safe start of the vehicle conforming to the change in the state. The comparison results will be largely changed in case that the ultrasonic sensors are frozen or snow is sticking onto the ultrasonic sensors at the time of starting the vehicle, and an alarm for this is given to the driver.

It is not necessary to actuate the ultrasonic sensors when the vehicle is continuously parked, and therefore it is also preferable to detect a situation of parking range or the parking brake being turned on (except for the time of starting the engine) and stop the alarming operation.

As described above, in this Embodiment 3, even when there are frequently obstacles near the place for parking, it is possible to safely stop the vehicle for parking. It is further possible to produce an alarm when the ultrasonic sensors are frozen or snow is sticking onto the ultrasonic sensors by comparing the state of the obstacles at the time of parking the vehicle with that at the time of starting the vehicle.

Embodiment 4

In this Embodiment 4, the ultrasonic sensor is disposed on the side of the parking lot, and the vehicle is safely stopped for parking. Freezing of the ultrasonic sensor and sticking of snow onto the ultrasonic sensor are monitored by comparing the state of obstacles at the time of parking the vehicle with that at the time of starting the vehicle.

(1) The ultrasonic sensor is disposed on a wall or the like in the rear of the place for stopping the vehicle at the parking lot (not shown in the drawing). The circuit of the ultrasonic obstacle detector in FIG. 2 is also disposed on the parking lot side (not shown). At the time of stopping the vehicle, obstacles such as wall in the rear, neighboring vehicle, and bicycle put near the rear, etc. are detected so that the vehicle does not bump against those obstacles.

(2) When the vehicle has stopped, the stopped state of the vehicle at the parking position is detected by the ultrasonic sensor, and is stored in a nonvolatile memory or the like incorporated in the microcomputer 30.

(3) Then, at the time of starting the vehicle, a sensor or the like for detecting an engine sound when the engine is started, is actuated to detect the state of the vehicle utilizing the sound as a trigger. At this time, if the ultrasonic sensor is frozen or snow is sticking onto the ultrasonic sensor, it is difficult to detect the state of the obstacles, and the signal level showing the state of the obstacles is lowered.

Instead of using the engine start as a trigger, it is also preferable to actuate the ultrasonic sensor by manually depressing a push button for starting the ultrasonic sensor disposed on the parking lot side. It is also preferable that the ultrasonic sensor is arranged to start its operation upon receipt of radio wave due to depression of a push button associated with the key of the vehicle (for example, a push button for unlocking doors of the vehicle).

It is also preferable that the ultrasonic sensor disposed on the parking lot side starts its operation upon receipt of a signal transmitted from an ultrasonic sensor disposed on the vehicle side.

(4) If there is any change in the state of the obstacles through the comparison between the state of the detected obstacles and the state thereof at the time of stopping the vehicle stored in the memory, an alarm is given to the driver for safe start of the vehicle conforming to the change in the state. The comparison results will be largely changed in case that the ultrasonic sensors are frozen or snow is sticking onto the ultrasonic sensors at the time of starting the vehicle, and an alarm for this is given to the driver.

The alarm is given by alarming means such as a speaker or an on-and-off warning light mounted on the ceiling or a wall of the parking lot so that the driver easily perceives the alarm. It is also preferable to employ such alarming means as ultrasonic wave, radio wave or the like given to the vehicle side.

As described above, in this Embodiment 4, the vehicle is safely stopped for parking. Furthermore, an alarm is exactly given in case that the ultrasonic sensor is frozen or snow is sticking onto the ultrasonic sensor through the comparison between the state of the vehicle at the time of parking and that at the time of starting.

Embodiment 5

In this Embodiment 5, the ultrasonic sensors are disposed on both vehicle side and parking lot side, whereby the vehicle is safely stopped for parking. Freezing of the ultrasonic sensor and sticking of snow onto the ultrasonic sensor are monitored by comparing the state of obstacles at the time of parking the vehicle with that at the time of starting the vehicle.

(1) Not only an ultrasonic sensor is disposed on a wall or the like in the rear of the place for stopping the vehicle at the parking lot (not shown in the drawing) but also another ultrasonic sensor is disposed on the vehicle side. Furthermore, the circuits of the ultrasonic obstacle detectors in FIG. 2 are respectively disposed on both parking lot side and vehicle side (not shown in the drawing). At the time of stopping the vehicle, obstacles such as wall in the rear, neighboring vehicle, and bicycle put near the rear, etc. are detected so that the vehicle does not bump against those obstacles.

(2) When the vehicle has stopped, the stopped state of the vehicle at the parking position is detected by the ultrasonic sensor, and is stored in a nonvolatile memory or the like incorporated in the microcomputer 30.

(3) Then, at the time of starting the vehicle, a sensor or the like for detecting an engine sound when the engine is started, is actuated to detect the state of the vehicle utilizing the sound as a trigger. At this time, if the ultrasonic sensor is frozen or snow is sticking onto the ultrasonic sensor, it is difficult to detect the state of the obstacles, and the signal level showing the state of the obstacles is lowered.

Instead of using the engine start as a trigger, it is also preferable to actuate the ultrasonic sensor by manually depressing a push button for starting the ultrasonic sensor disposed on the parking lot side. It is also preferable that the ultrasonic sensor is arranged to start its operation upon receipt of radio wave due to depression of a push button cooperating with the key operation of the vehicle (for example, a push button for unlocking doors of the vehicle).

It is also preferable that the ultrasonic sensor disposed on the parking lot side starts its operation upon receipt of a signal transmitted from an ultrasonic sensor disposed on the vehicle side.

(4) The state of the vehicle stored in the memory by the ultrasonic sensor disposed on the parking lot side is transferred to the ultrasonic sensor disposed on the vehicle side. If there is any change in the state of the obstacles through the comparison between the state of the detected obstacles and the state thereof at the time of stopping the vehicle stored in the memory, an alarm is given to the driver for safe start of the vehicle conforming to the change in the state.

The comparison results will be largely changed in case that the ultrasonic sensors are frozen or snow is sticking onto the ultrasonic sensors at the time of starting the vehicle, and an alarm for this is given to the driver. This alarm is given by the ultrasonic obstacle detector disposed on the vehicle side or on both of the ultrasonic obstacle detectors disposed on the vehicle side and the parking lot side.

As described above, in this Embodiment 4, the vehicle is safely stopped for parking. Furthermore, an alarm is exactly given in case that the ultrasonic sensor is frozen or snow is sticking onto the ultrasonic sensor through the comparison between the state of the vehicle at the time of parking and that at the time of starting.

Embodiment 6

In this Embodiment 6, obstacles are monitored when the vehicle is driven at a low speed, and sticking of extraneous matter such as snow or mud onto the ultrasonic sensors is monitored when the vehicle is driven at a speed higher than normal speed.

A corner sensor and a back sensor for vehicles have been conventionally used to detect the presence of obstacles when the vehicle is driven at a low speed at the time of parking or the like. Those conventional sensors are arranged not to detect any noise from outside such as guard rail, succeeding vehicle, and reflected waves from the ground detected when the vehicle is driven at a medium speed or a high speed.

Figure 4:
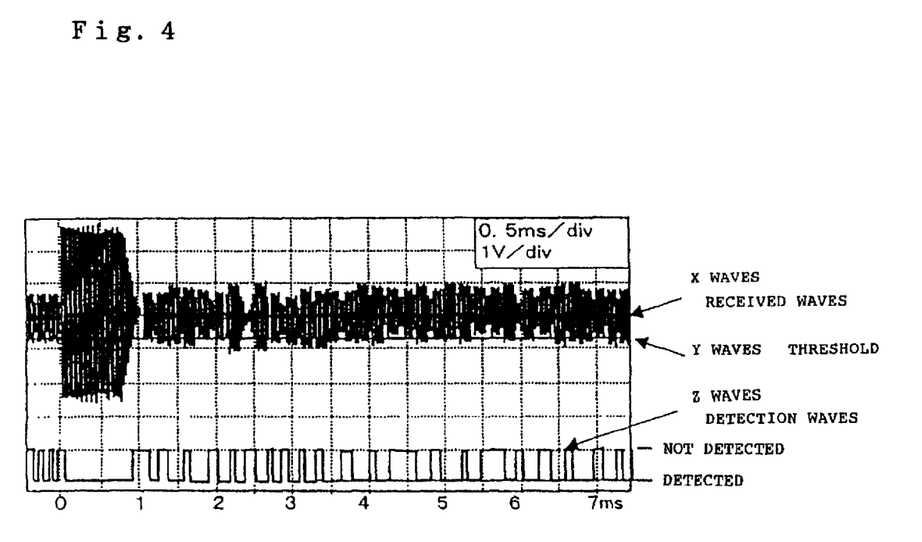
FIG. 4 is a diagram showing a waveform of transmitted/received ultrasonic waves when an ultrasonic sensor detects a noise from outside according to Embodiment 6 of the invention.

FIG. 4 shows a manner of the ultrasonic sensors detecting a noise from outside when the vehicle is driven at a medium speed or a high speed, and shows that generation of noise from outside is utilized in this Embodiment 6 of the invention.

(1) When the vehicle is driven at a low speed (for example, at less than 20 km/h), the ultrasonic sensors detect obstacles.

(2) When the vehicle is driven at a normal speed (assuming that the medium speed and the high speed are over 20 km/h), the ultrasonic sensors detect the state of noise from outside. At this time, the noise level is lowered if extraneous matter such as snow or mud is sticking onto the ultrasonic sensors.

(3) If the noise level is continuously lowered for more than a fixed time, it is judged that there is any extraneous matter sticking such as snow or mud, and the presence of the extraneous matter is stored in.

If the noise level does not continue for more than the fixed time, the judgement is changed to that there is no extraneous matter.

(4) When the driving speed of the vehicle comes down to a low speed and the ultrasonic sensors are turned into a mode of detecting obstacles and begin their alarming operation, then it is judged that there is extraneous matter on the ultrasonic sensors and that the ultrasonic sensors are in abnormal condition.

As described above, in this Embodiment 6, the ultrasonic sensors are turned into a mode of detecting obstacles when the vehicle is driven at a low speed. The ultrasonic sensors are turned into a mode of checking the ultrasonic sensors for extraneous matter such as snow or mud when the vehicle is driven at a medium speed or a high speed. As a result, it is no more necessary to add neither special parts nor special system as long as the ultrasonic sensors are put into operation at all times. Since it is judged that there is extraneous matter if the noise level continues for more than a fixed time, it is possible to make a reliable judgement not being made in a short time.

Embodiment 7

In this Embodiment 7, reflected waves from the ground are utilized for detecting extraneous matter such as snow or mud sticking to the ultrasonic sensor.

Figure 5:
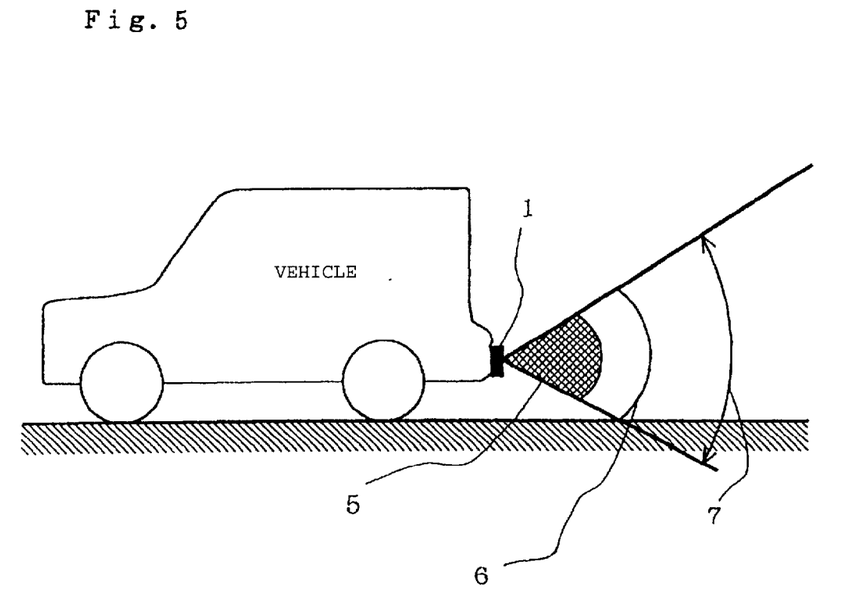
FIG. 5 is a schematic view showing a state of transmitted/received ultrasonic waves and a state of other essential part when an ultrasonic sensor is mounted on the rear bumper of the vehicle according to Embodiment 7 of the invention.

FIG. 5 shows a detection range of the ultrasonic sensor 1 disposed in the vicinity of the rear bumper of the vehicle. That is, obstacles are detected within the range of a sensor detection range 5. Numeral 6 is a ground detection range in which reflected waves from the ground are detected, and numeral 7 is a detection angle of the ultrasonic sensor.

Figure 6:
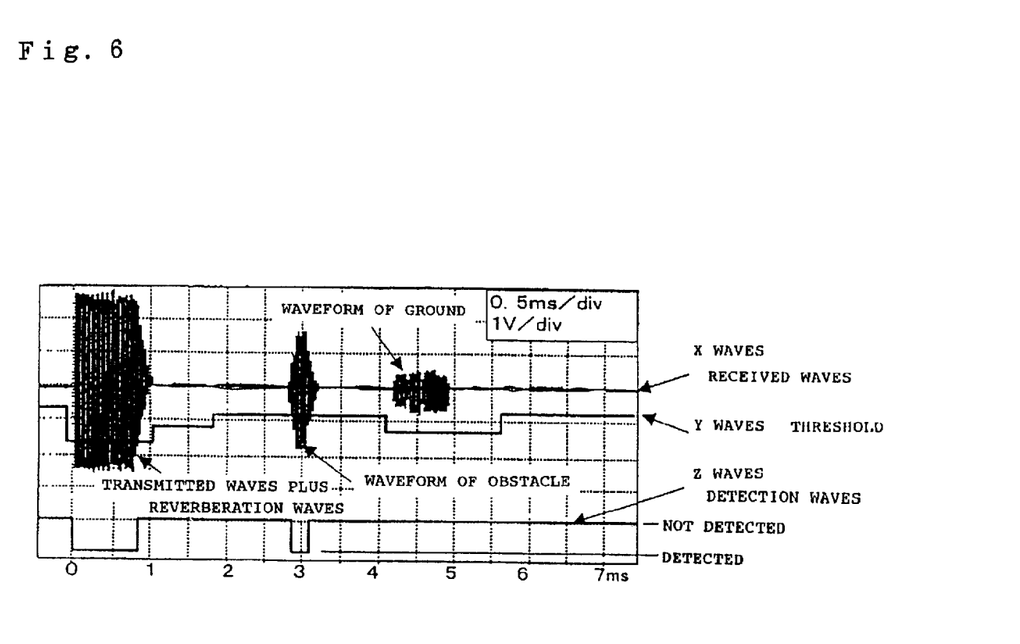
FIG. 6 is a chart showing a waveform of transmitted/received ultrasonic waves and a waveform of other essential part by conventional means for detecting an obstacle for the purpose of explaining Embodiment 7 of the invention.
Figure 7:
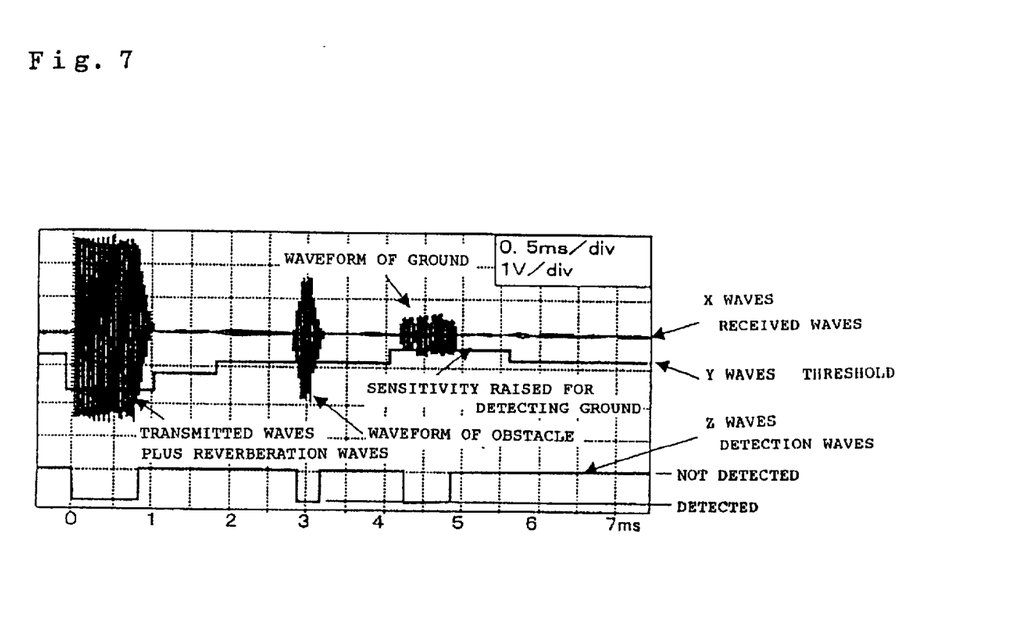
FIG. 7 is a chart showing a waveform of transmitted/received ultrasonic waves and that of other essential part when an ultrasonic sensor detects reflected waves from the ground according to Embodiment 7 of the invention.

FIG. 6 shows a waveform in an ultrasonic sensor and a waveform in a circuit portion according to a conventional detector, and FIG. 7 shows a waveform in the ultrasonic sensor and a waveform in a circuit section according to this Embodiment 7.

In the conventional system, reflected waves from the ground are not necessary for detecting obstacles by means of an ultrasonic sensor. Accordingly, not to detect the waveform due to reflected waves from the ground shown in FIG. 6, a threshold being Y waves is lowered (this case shows that threshold is low and the sensitivity is lowered) at the timing of appearing a waveform of the ground, and the waveform from the ground is cut out.

On the other hand, in this Embodiment 7, as shown in FIG. 7, the threshold of the Y waves is adjusted to a high value to raise the sensitivity at the time of appearing the waveform of the ground appears in order to actively detect the waveform of the ground. Consequently, a detection signal of Z waves is outputted. In the circuit diagram of FIG. 2, the microcomputer 30 switches the threshold switching circuit 28 at a predetermined timing.

The waveform of the ground is not detected when snow, mud or the like sticks onto the ultrasonic sensor, and an alarm for this is given.

It is also preferable that the amplification factor switching circuit 27 shown in FIG. 2 is switched over to raise an amplification factor instead of raising the sensitivity for the threshold. In this case, the amplitude of the waveform of the ground shown in FIG. 7 is increased and the sensitivity is improved.

Figure 8:
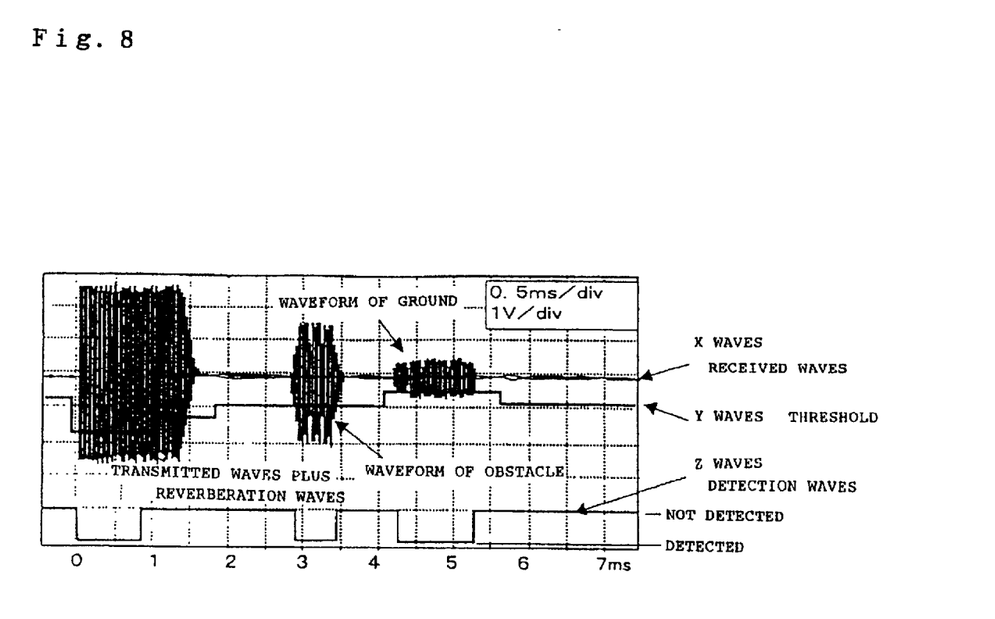
FIG. 8 is a chart showing a waveform of transmitted/received ultrasonic waves and that of other essential part when transmission time of ultrasonic waves is extended according to Embodiment 7 of the invention.

When a transmission time of transmitted waves is extended as shown in FIG. 8, reflected waves from the ground are also extended in accordance with the transmission time, and it is possible to raise the sensitivity.

Figure 9:
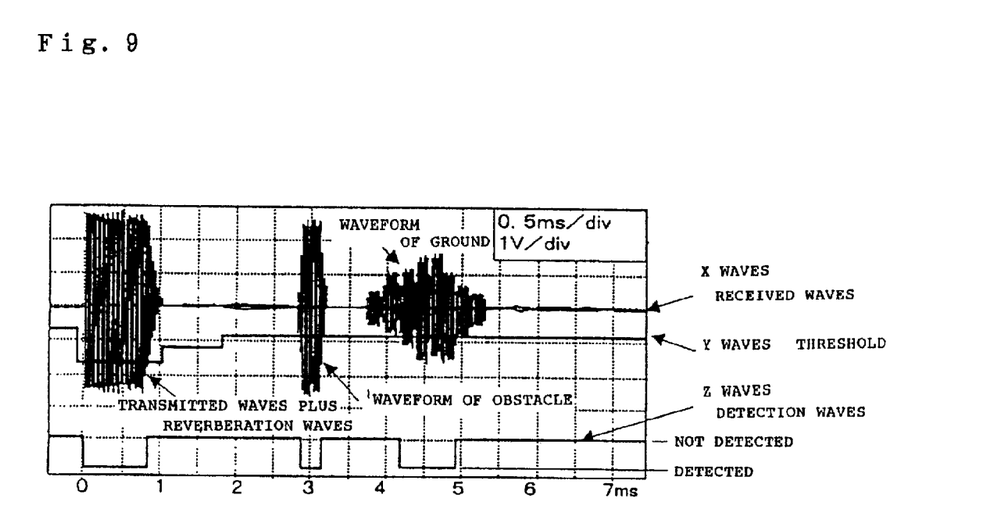
FIG. 9 is a chart showing a waveform of transmitted/received ultrasonic waves and that of other essential part when a transmission sound pressure of ultrasonic waves is raised according to Embodiment 7 of the invention.

As shown in FIG. 9, when a transmission sound pressure is raised, reflected waves from the ground are increased, and the detection sensitivity is raised. In FIG. 9, it seems that the level of the transmitted waves is not increased. This is because the waveform is an attenuated waveform for observation, and actual level of the transmitted waves from the ultrasonic sensor mounts to a value that is larger by several times than the value in FIG. 9.

It is also preferable to optionally combine those elements such as switching of the threshold, switching of the amplification factor, increasing of the transmission time of the transmitted waves, increasing of the transmission sound pressure, etc.

As described above, in this Embodiment 7, reflected waves from the ground are actively detected, and when extraneous matter such as snow or mud is sticking onto the ultrasonic sensor, the level of the received waves is lowered and an alarm is given. In addition, neither special parts nor special system is required.

Embodiment 8

In this Embodiment 8, in the same manner as in the foregoing Embodiment 7, reflected waves from the ground are utilized for detecting extraneous matter such as snow or mud sticking to the ultrasonic sensor.

Figure 10:
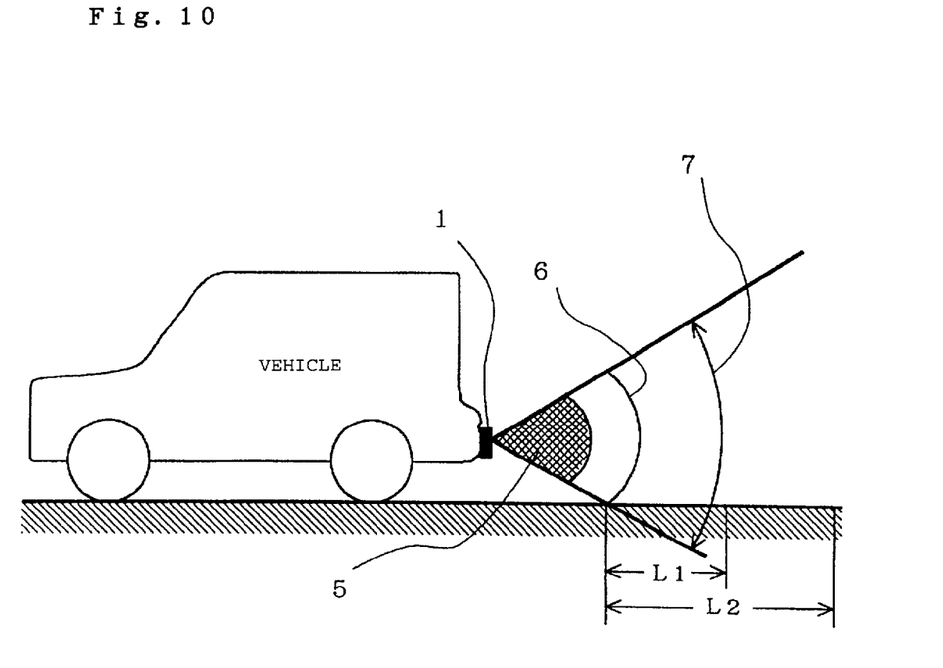
FIG. 10 is a view showing a detection distance range of reflected waves from the ground according to Embodiment 8 of the invention.
Figure 11:
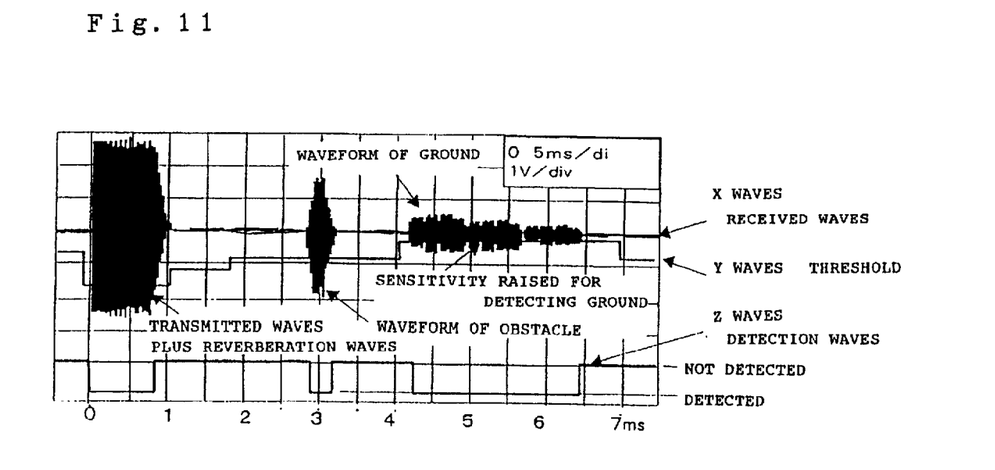
FIG. 11 is a chart showing a waveform of transmitted/received ultrasonic waves and that of other essential part when the detection distance range of reflected waves from the ground is extended according to Embodiment 8 of the invention.

FIG. 10 is to explain a detection distance of reflected waves from the ground, and FIG. 11 is a waveform chart showing that the detection distance is extended.

In FIG. 10, reference numeral L1 is a normal detection distance range detected in the foregoing Embodiment 7 and so on, and reference numeral L2 is an enlarged detection distance range in Embodiment 8. When the detection distance range is enlarged like this, the sensitivity is improved by detecting reflected waves from the ground in the range of a long distance as shown in FIG. 11, and it is possible to raise the sensitivity for detecting extraneous matter such as snow or mud sticking to the ultrasonic sensor.

It is also preferable to optionally combine the means for improving the sensitivity in the foregoing Embodiment 8 and the means for improving the sensitivity in the foregoing Embodiment 7.

As described above, in this Embodiment 8, in the same manner as in Embodiment 7, reflected waves from the ground are actively detected, and it is possible to detect extraneous matter such as snow or mud on the ultrasonic sensor and give an alarm. In addition, neither special parts nor special system is required.

Embodiment 9

In Embodiment 9, sticking of snow, mud or the like is detected from a waveform of reverberation waves.

Figure 12:
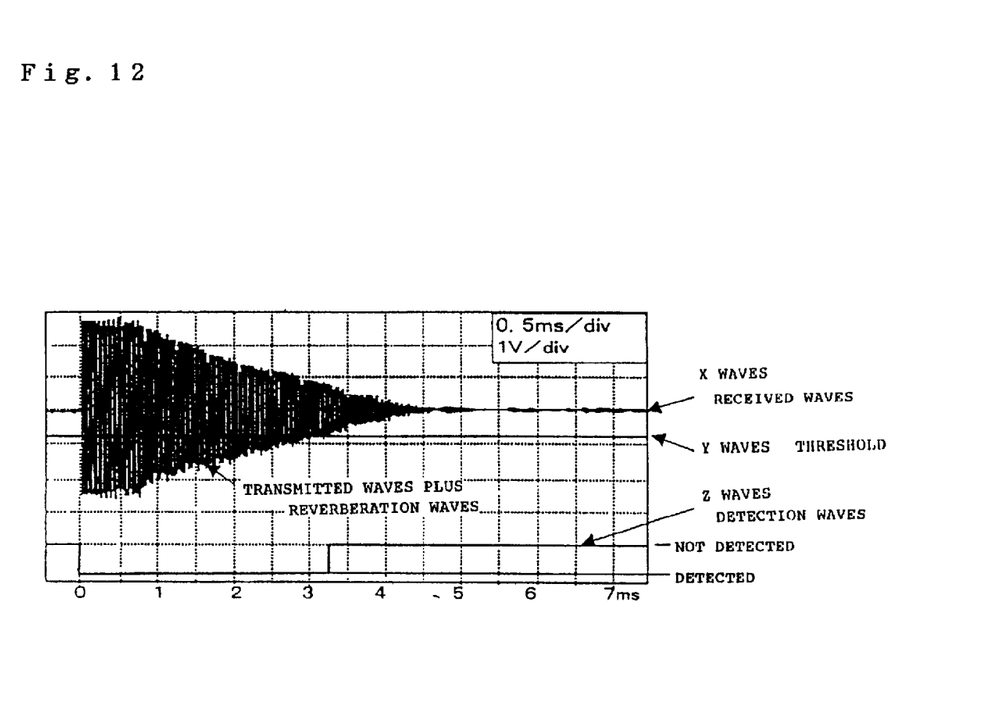
FIG. 12 is a chart showing a waveform of transmitted/received ultrasonic waves and that of other essential part when the ultrasonic sensor is frozen according to Embodiment 9 of the invention.

FIG. 12 shows a waveform of transmitted waves plus reverberation waves in case that the ultrasonic sensor is frozen. When the ultrasonic sensor is frozen, the waveform of the reverberation waves becomes sometimes longer than that under the normal condition like this, and this phenomenon is detected.

Figure 13:
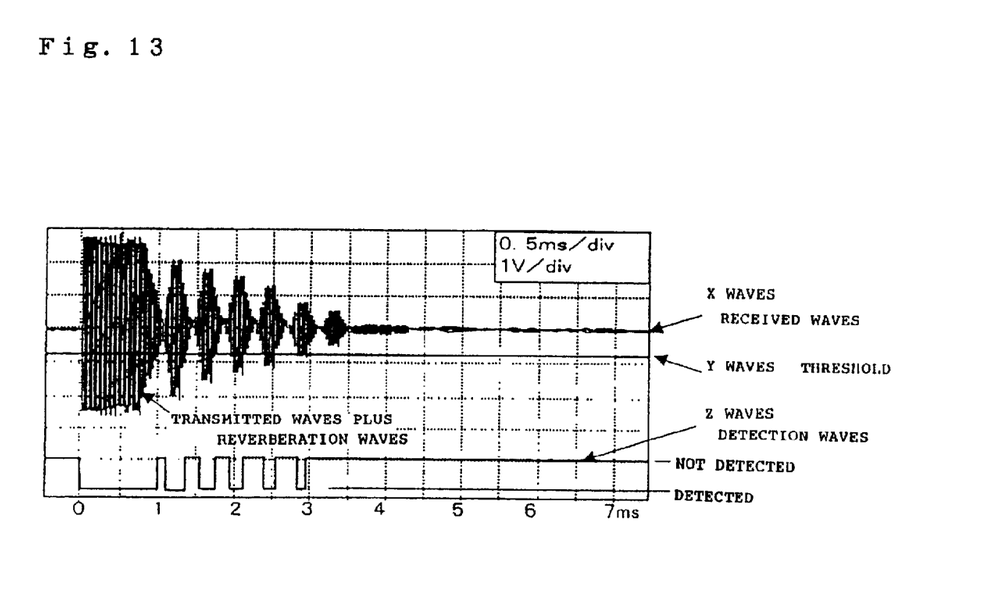
FIG. 13 is a chart showing a waveform of transmitted/received ultrasonic waves and that of other essential part when the ultrasonic sensor is frozen according to Embodiment 9 of the invention.

FIG. 13 also shows a waveform of transmitted waves plus reverberation waves in case that the ultrasonic sensor is frozen. When the ultrasonic sensor is frozen, a swell is sometimes generated due to small change in frequency of the waveform of the reverberation waves from that under the normal condition like this, and this phenomenon is detected.

The phenomena of the reverberation waveform in FIGS. 12 and 13 do not always occur when the ultrasonic sensor is frozen, however, it is possible to give an alarm that the ultrasonic sensor is frozen when these phenomena occur.

It is also preferable to optionally combine the means in Embodiment 8 with the foregoing Embodiments 1 to 7 and use them.

It is to be understood that the invention is not limited to the foregoing embodiments and various changes and modifications may be made without departing from the spirit and scope of the invention.

What is claimed is:

1. An ultrasonic obstacle detector for detecting an obstacle using a plurality of ultrasonic sensors transmitting and receiving ultrasonic waves comprising:

said plurality of said ultrasonic sensors disposed close to each other so that one of said plurality of ultrasonic sensors is arranged to receive direct waves transmitted from at least one of the other of said plurality of ultrasonic sensors, and means for detecting a state of extraneous matter sticking to at least one of said ultrasonic sensors according to a reception level of said direct waves.

2. An ultrasonic obstacle detector for detecting an obstacle using at least three ultrasonic sensors transmitting and receiving ultrasonic waves comprising:

said ultrasonic sensors disposed close to each other so that one of the ultrasonic sensors is arranged to receive direct waves transmitted from at least one of the other ultrasonic sensors, and means for judging the ultrasonic sensors to which extraneous matter is sticking, according to a reception level of the direct waves for each combination of an ultrasonic sensor transmitting ultrasonic waves and an ultrasonic sensor receiving the transmitted direct waves.

3. An ultrasonic obstacle detector for detecting an obstacle using a plurality of ultrasonic sensors transmitting and receiving ultrasonic waves comprising:

said plurality of said ultrasonic sensors disposed close to each other so that one of said plurality of ultrasonic sensors is arranged to receive direct waves transmitted from at least one of the other of said plurality of ultrasonic sensors, and means for calculating a temperature on the basis of a transfer time and a transfer distance of said direct waves between the two ultrasonic sensors transmitting and receiving the direct waves, and judging whether or not there is a possibility of extraneous matter sticking to the ultrasonic sensors according to a value of the calculated temperature.

* * * * *